(12) United States Patent
Matsumoto

(10) Patent No.: US 11,879,436 B2
(45) Date of Patent: Jan. 23, 2024

(54) LIGHTNING SUPPRESSION DEVICE FOR WIND TURBINE BLADES

(71) Applicant: LIGHTNING SUPPRESSION SYSTEMS CO., LTD., Kanagawa (JP)

(72) Inventor: Toshio Matsumoto, Kanagawa (JP)

(73) Assignee: LIGHTNING SUPPRESSION SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/156,818

(22) Filed: Jan. 19, 2023

(65) Prior Publication Data
US 2023/0250807 A1    Aug. 10, 2023

(30) Foreign Application Priority Data

Jan. 19, 2022 (JP) ................................. 2022-006368
Jul. 6, 2022 (JP) ................................. 2022-108761

(51) Int. Cl.
*F03D 80/30* (2016.01)
*H02G 13/00* (2006.01)

(52) U.S. Cl.
CPC .............. *F03D 80/30* (2016.05); *H02G 13/80* (2013.01); *F03D 80/301* (2023.08); *F05B 2230/80* (2013.01); *F05B 2240/307* (2020.08); *Y02E 10/72* (2013.01)

(58) Field of Classification Search
CPC .... F03D 80/30; Y02E 10/72; F05B 2240/307; H02G 13/80
See application file for complete search history.

(56) References Cited

U.S. PATENT DOCUMENTS

| 9,169,826 | B2 * | 10/2015 | Muto | H02G 13/80 |
| 9,797,369 | B2 * | 10/2017 | Kratmann | F03D 1/0633 |
| 10,443,579 | B2 * | 10/2019 | Tobin | F03D 80/30 |
| 11,015,582 | B2 * | 5/2021 | Barton | F03D 1/0675 |

(Continued)

FOREIGN PATENT DOCUMENTS

| CN | 108547744 A | * | 9/2018 |
| CN | 108691734 A | * | 10/2018 |

(Continued)

OTHER PUBLICATIONS

English translation of JP5874992B1 (Year: 2016).*

(Continued)

*Primary Examiner* — Igor Kershteyn
*Assistant Examiner* — Wesley Le Fisher
(74) *Attorney, Agent, or Firm* — Calfee, Halter & Griswold LLP

(57) ABSTRACT

Provided is a lightning suppression device for wind turbine blades that is provided at a tip of a wind turbine blade and suppresses lightning struck on the wind turbine blade, the device including: an electrical insulator attached to the tip of the wind turbine blade and formed of a non-conductive material; an internal electrode attached to the electrical insulator on a side opposite to the wind turbine blade; and an external electrode attached to the electrical insulator so as to surround the internal electrode with a predetermined gap therebetween, wherein the electrical insulator is fixed to the tip of the wind turbine blade by a fixing member, and a ground line is connected to the internal electrode.

8 Claims, 12 Drawing Sheets

(56) References Cited

U.S. PATENT DOCUMENTS

| | | | | |
|---|---|---|---|---|
| 2012/0301300 A1* | 11/2012 | Muto | ................ | F03D 1/0675 |
| | | | | 416/146 R |
| 2014/0112787 A1* | 4/2014 | Bracht | ................ | F03D 80/30 |
| | | | | 416/146 R |
| 2015/0292477 A1* | 10/2015 | Kratmann | ............ | F03D 1/0675 |
| | | | | 416/232 |

FOREIGN PATENT DOCUMENTS

| | | | | | |
|---|---|---|---|---|---|
| CN | 209855973 U | * | 12/2019 | | |
| EP | 3255275 A1 | * | 12/2017 | | |
| JP | 2005113735 A | * | 4/2005 | | |
| JP | 2012-246812 A | | 12/2012 | | |
| JP | 5839331 B1 | | 1/2016 | | |
| JP | 5874992 B1 | * | 3/2016 | ............ | F03D 80/30 |
| JP | 6347340 B1 | | 6/2018 | | |
| JP | 2021-124100 A | | 8/2021 | | |
| WO | WO-2018050196 A1 | * | 3/2018 | ............. | F03D 1/06 |
| WO | 2019/087431 A1 | | 5/2019 | | |

OTHER PUBLICATIONS

English translation of CN108691734A (Year: 2018).*
English translation of JP2005113735A (Year: 2005).*
Cap Nuts; The Home Depot; Jan. 19, 2018 (Year: 2018).*
English translation of CN108547744A (Year: 2018).*
English translation of CN209855973U (Year: 2019).*

\* cited by examiner

LIGHTNING SUPPRESSION DEVICE FOR WIND TURBINE BLADES

CROSS-REFERENCE TO RELATED APPLICATIONS

This application claims priority to Japanese Application No. 2022-006368, filed on Jan. 19, 2022, and to Japanese Application No. 2022-108761, filed on Jul. 6, 2022, the contents of which are hereby incorporated by reference as if recited in their entirety.

BACKGROUND

Technical Field

The present invention relates to a lightning suppression device for wind turbine blades that suppresses lightning to wind turbine blades, particularly, wind turbine blades constituting a wind turbine of a wind power generator, thereby suppressing damages on the wind power generator.

Related Art

Wind energy is known as one example of renewable energy.

A wind power generator for generating power using this wind energy includes a wind turbine.

The wind turbine includes a tall strut, a nacelle mounted to an upper end of the strut and having a generator installed therein, and a large number of wind turbine blades mounted to the nacelle and rotationally driving the generator.

In such a wind power generator, the wind turbine blades are rotated by wind that naturally occurs, and the generator is rotationally driven in conjunction with the rotation of the wind turbine blades, thereby generating power.

Here, the strut is formed to be tall and the wind turbine blades are provided at high positions to efficiently receive wind. In addition, the wind turbine blades are formed to be long to increase the power generation amount.

Each wind turbine blade is formed so as to have a length of, for example, about several tens of meters to one hundred meters.

Here, the wind turbine blade is designed such that the speed of the tip of the wind turbine blade does not exceed the sound speed in order to avoid the generation of shock waves.

For example, when the rotation speed is 20 rotations per minute, the upper limit value of the length of the wind turbine blade in practical operation is estimated to be about 110 meters. Note that, with this length of the wind turbine blade, the speed of the tip of the wind turbine blade is about 230 meters per second.

In such a wind power generator, as the wind turbine blades rotate, the tip of one of the wind turbine blades reaches the highest position in the whole wind power generator, that is, the position closest to a thundercloud.

Therefore, lightning is likely to occur toward the wind turbine blades.

As one example of a countermeasure against such inconvenience, a wind power generation blade described in JP 2012-246812 A is known.

In the wind power generation blade (corresponding to the wind turbine blade) described in JP 2012-246812 A, a metallic lightning receiving portion is provided at the tip thereof, a ground line is electrically connected to the lightning receiving portion, and the ground line is buried in the ground through the inside of the wind turbine blade and the strut.

With the above-mentioned configuration, when lightning occurs toward the wind power generation blade, the wind power generation blade described in JP 2012-246812 A can guide the lightning to the lightning receiving portion so as to cause the lightning stroke to flow to the ground via the ground line.

As a result, the wind power generation blade described in JP 2012-246812 A can suppress damages on the wind power generation blade, the nacelle and various devices installed in the nacelle due to the lightning stroke.

SUMMARY

In such a conventional wind turbine blade, there remains the following problem that requires improvement.

The conventional wind turbine blade cannot always guide lightning to the lightning receiving portion even when the lightning occurs toward the wind turbine blade. In fact, an accident has been confirmed in which lightning occurring toward a wind turbine blade, directly strikes an outer surface or the like of the wind turbine blade.

In addition, since lightning is guided toward the lightning receiving portion, the number of times that lightning directly strikes the wind turbine blade increases.

Therefore, it cannot necessarily be said that the conventional wind turbine blade can effectively suppress damages on the wind turbine blade, a nacelle, various devices installed in the nacelle, and a strut.

Such a problem is derived from a technical idea of guiding lightning to a place where there is no to-be-protected body.

On the other hand, for example, a lightning suppression device described in JP 5839331 B1 is known as a new technique for dealing with lightning which focuses on a lightning generation mechanism. It is considered that such a lightning suppression device can greatly reduce the number of times that lightning directly strikes a wind turbine blade when being mounted to the tip of the wind turbine blade.

Inside a thundercloud, charge separation occurs, and a lower part thereof is negatively charged.

For example, when the bottom of the thundercloud is negatively charged, the surface of the ground located below the thundercloud is positively charged due to electrostatic induction. In the case of a high position, such as a lightning rod, a tree, or the like, since the distance from the thundercloud is short, the density of positive charge is large.

Here, inside the thundercloud, since the potential difference is extremely large due to charge separation, electrical insulation in the atmosphere is locally broken, and weak discharge occurs.

In lightning, a weak discharge (stepped leader) having a negative charge advances downwardly from a thundercloud, and keeps advancing intermittently toward the ground.

On the other hand, since the potential difference between the bottom of the thundercloud and the vicinity of the surface of the ground becomes extremely large, the electrical insulation in the atmosphere is locally broken, and a weak discharge (streamer) with a positive charge occurs upwardly from the vicinity of the surface of the ground, particularly a lightning rod, a tree, and the like.

When the stepped leader and the streamer are combined, the bottom of the thundercloud and the surface of the ground are electrically connected in the discharge route, and a very strong current (feedback current) flows in accordance with the potential difference. This feedback current is generally called lightning.

The lightning suppression device described in JP 5839331 B1 includes a lower electrode and an upper electrode forming a capacitor, and the lower electrode is grounded.

With the above-mentioned configuration, in the lightning suppression device described in JP 5839331 B1, since the lower electrode carries the same type of charges as the charges carried on the ground surface, the upper electrode carries the same type of charge as the charge carried at the bottom of the thundercloud, thereby reducing the potential difference between the upper electrode and the bottom of the thundercloud.

As a result, the lightning suppression device described in JP 5839331 B1 can suppress the generation of streamer and can prevent a direct strike of lightning as feedback current.

Here, the lightning suppression device described in JP 5839331 B1 has an outer shape of a substantially spherical shape so that it is possible to prevent a portion having a high charge density to be locally formed in the upper electrode.

As a result, again, the lightning suppression device described in JP 5839331 B1 can suppress the generation of streamer and can prevent a direct strike of lightning as feedback current.

However, in order to mount such a lightning suppression device to the tip of the wind turbine blade, the following problem needs to be solved.

When the wind turbine blades rotate, a strong centrifugal force acts on the lightning suppression device mounted to the tip of the wind turbine blade in such a direction that the lightning suppression device becomes detached.

For example, when the rotation speed is 20 rotations per minute and the length of the wind turbine blade is 110 meters, the magnitude of the centrifugal force acting on the lightning suppression device is calculated to be about 49 times the magnitude of the gravity acting on the lightning suppression device.

Besides, when the wind turbine blades rotate, a strong wind pressure is applied to the lightning suppression device mounted to the tip of the wind turbine blade.

For example, when the rotation speed is 20 rotations per minute and the length of the wind turbine blade is 110 meters, the wind pressure applied to the lightning suppression device is calculated to be about 33 kilonewtons per square meter.

In that case, if the outer shape of the lightning suppression device is spherical and the diameter thereof is 20 cm, the magnitude of the wind pressure resistance force acting on the lightning suppression device is estimated to be about 530 newtons, that is, to be almost equal to the magnitude of the gravity acting on the mass of about 54 kilograms.

The lightning suppression device mounted to the tip of the wind turbine blade may be easily detached due to the centrifugal force and the wind pressure resistance force described above, resulting in the loss of the lightning suppression effect.

In view of the actual conditions mentioned above, the problem to be solved by the present invention is to provide a lightning suppression device for wind turbine blades capable of preventing the detachment thereof from the wind turbine blade as much as possible.

In addition, in order to provide such a lightning suppression device for wind turbine blades, another problem to be solved by the present invention is to minimize the influence on the aerodynamic characteristics of the wind turbine blades.

In order to solve the above-mentioned problems, the present invention provides a lightning suppression device for wind turbine blades that is provided at a tip of a wind turbine blade and suppresses lightning struck on the wind turbine blade, the device including: an electrical insulator attached to the tip of the wind turbine blade and formed of a non-conductive material; an internal electrode attached to the electrical insulator on a side opposite to the wind turbine blade; and an external electrode attached to the electrical insulator so as to surround the internal electrode with a predetermined gap therebetween, wherein the electrical insulator is fixed to the tip of the wind turbine blade by a fixing member, and a ground line is connected to the internal electrode.

The present invention has a mechanism similar to that of the lightning suppression device described in JP 5839331 B1 and provides a lightning suppression effect.

For example, when the bottom of the thundercloud is negatively charged, the surface of the ground located below the thundercloud is positively charged due to electrostatic induction.

In that case, since the internal electrode is electrically connected to the surface of the ground and thus is positively charged, the external electrode is negatively charged due to electrostatic induction.

Since the external electrode has a negative charge which is the same type as the charge at the bottom of the thundercloud, when the wind turbine blades rotate and the tip of one wind turbine blade faces the thundercloud, the potential difference between the bottom of the thundercloud having a negative charge and the external electrode also having a negative charge is reduced.

Therefore, the generation of streamer from the external electrode is suppressed, and thus, it becomes possible to suppress a direct hit of lightning as feedback current to the external electrode.

Such a lightning suppression effect is expected to extend to the entire wind turbine and the power supply and distribution facility and the power transmission line provided side by side with the wind turbine, by the negative charge distribution region in the external electrode serving as a role of a barrier for protecting an area therebelow from the direct hit of lightning.

With the above-mentioned configuration, a user of the present invention can fix the electrical insulator to the tip of the wind turbine blade while avoiding the internal electrode and the external electrode.

That is, since the internal electrode and the external electrode are attached to the electrical insulator on the side opposite to the wind turbine blade, there is a wide area in the electrical insulator for a portion where the fixing member to the tip of the wind turbine blade is to be provided.

Therefore, the user of the present invention can relatively freely select the installation position and the fixation form of the fixing member to firmly fix the electrical insulator and the tip of the wind turbine blade.

As a result, the present invention can prevent the detachment thereof from the tip of the wind turbine blade while sufficiently resisting the centrifugal force and the wind pressure resistance force so as to secure the soundness of the wind turbine.

Besides, according to one embodiment of the present invention, the internal electrode is formed into a plate shape.

With the above-mentioned configuration, the user of the present invention can form the outer shape of the external electrode into a flat shape in accordance with the shape of the internal electrode.

As a result, the present invention can prevent the detachment thereof from the tip of the wind turbine blade while further sufficiently resisting the wind pressure resistance force when the wind turbine blades rotate, so as to further secure the soundness of the wind turbine. Besides, according to one embodiment of the present invention, the internal electrode is formed into a semicircular shape.

With the above-mentioned configuration, the user of the present invention does not need to form the tip of the wind turbine blade in a complex manner in order to install the lightning suppression device; it is sufficient, for example, to form it in a flat shape.

In addition, the original aerodynamic characteristics of the wind turbine blades can be maintained as much as possible.

Besides, according to one embodiment of the present invention, the internal electrode is formed into a hollow shape.

With the above-mentioned configuration, the user of the present invention can increase the pole plate area of a capacitor formed by the internal electrode and the external electrode so as to increase the electrostatic capacitance thereof.

As a result, the present invention can further enhance the lightning suppression effect by guiding more charges to the external electrode and enlarging a charge distribution region in the external electrode.

Besides, according to one embodiment of the present invention, the internal electrode is formed into a substantially hemispherical shell shape in cross section.

With the above-mentioned configuration, the user of the present invention does not need to form the tip of the wind turbine blade in a complex manner in order to install the lightning suppression device; it is sufficient, for example, to form it in a flat shape.

In addition, the aerodynamic characteristics of the wind turbine blades can be maintained to some extent.

Besides, in the present invention, the electrical insulator is formed so that the substantially entire contact surface with the tip of the wind turbine blade is flat when attached to the tip of the wind turbine blade.

With the above-mentioned configuration, the user of the present invention can simplify and reduce the cost of manufacturing the wind turbine blades to which the lightning suppression device is attached.

Besides, in the present invention, the electrical insulator is formed to be fitted by a concave-convex structure when attached to the tip of the wind turbine blade.

With the above-mentioned configuration, in the present invention, it further increases the fixing force between the electrical insulator and the tip of the wind turbine blade.

In addition, in the present invention, a reinforcing member is preferably provided at the tip of the wind turbine blade in an integrated manner, and the reinforcing member and the electrical insulator are fixed by the fixing member.

With the above-mentioned configuration, in the present invention, the fixation between the electrical insulator and the wind turbine blades is further strengthened, and the detachment from the tip of the wind turbine blade is prevented, so as to further secure the soundness of the wind turbine.

Besides, in the present invention, the external electrode preferably has an outer surface formed to extend substantially along an extended surface of an outer surface of the wind turbine blade.

With the above-mentioned configuration, in the present invention, the outer shape of the tip of the wind turbine blade is maintained, whereby it becomes possible to exhibit the lightning suppression effect while minimizing the influence on the aerodynamic characteristics of the wind turbine blade.

In the present invention, the ground line is connected to the internal electrode via the fixing member.

With the above-mentioned configuration, in the present invention, the number of components is reduced and the assembly process can be simplified.

Furthermore, in the present invention, more preferably, a plurality of the fixing members is provided.

With the above-mentioned configuration, in the present invention, the internal electrode is supported by the plurality of fixing members, and thus, is further stably fixed to the electrical insulator, whereby the soundness of the lightning suppression device itself can be secured.

The lightning suppression device for wind turbine blades of the present invention achieves a firm fixation with the tip of the wind turbine blade, which allows the soundness of the wind turbine blade to be secured.

In addition, in the lightning suppression device for wind turbine blades of the present invention, the external electrode has an outer surface formed to extend substantially along an extended surface of an outer surface of the wind turbine blade, whereby it becomes possible to exhibit the lightning suppression effect while minimizing the influence on the aerodynamic characteristics of the wind turbine blade.

DETAILED DESCRIPTION

Hereinafter, a first embodiment of the present invention will be described with reference to the drawings.

Figure 1:
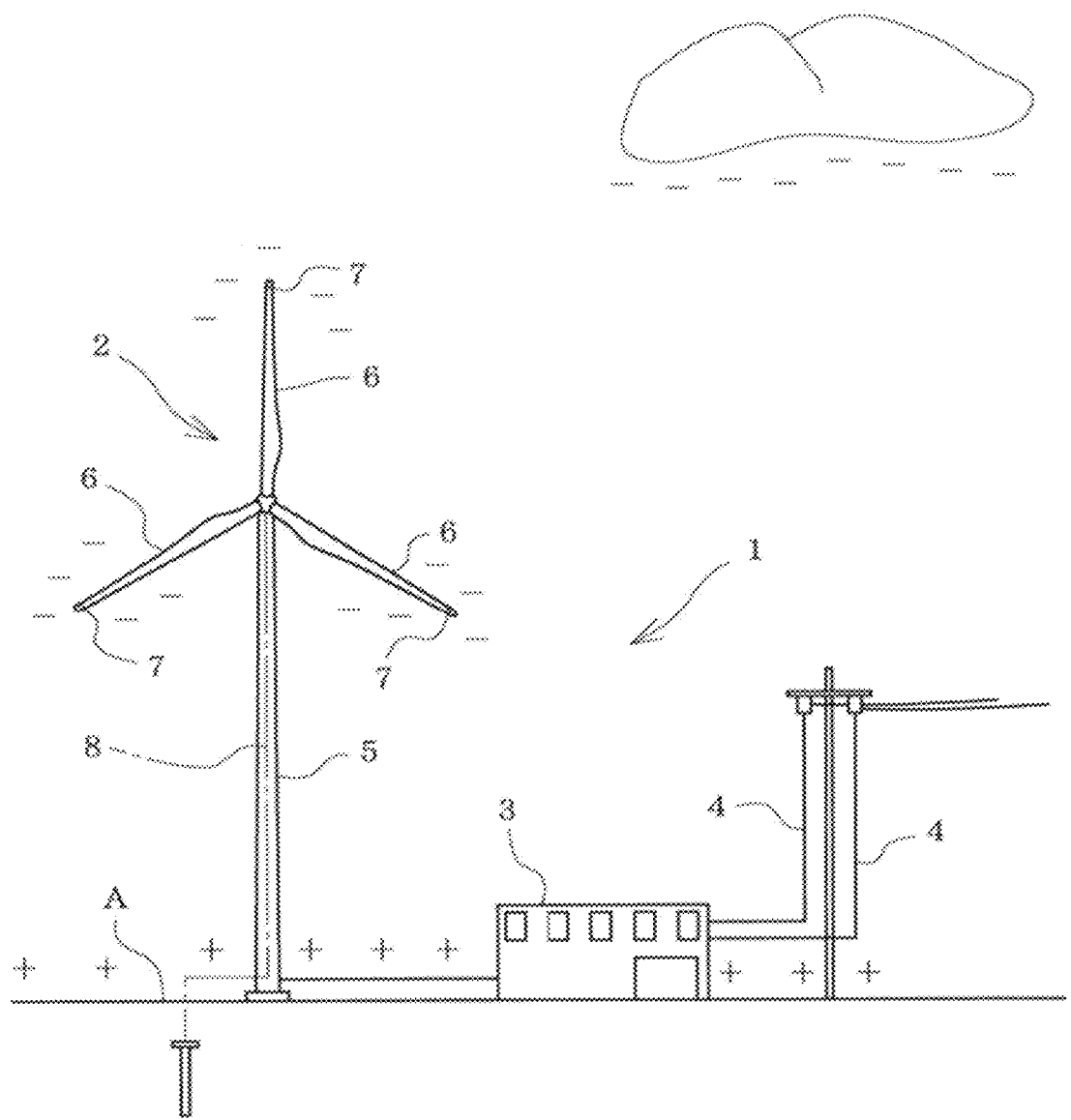
FIG. 1 is an overall view of a wind power generation facility to which a first embodiment of the present invention is applied.

In FIG. 1, a reference sign 1 denotes a wind power generation facility to which the present embodiment is applied, and a reference sign A denotes ground on which the wind power generation facility 1 stands.

The wind power generation facility 1 includes a wind turbine 2 for wind power generation, and a power supply and distribution facility 3 and power transmission lines 4 for supplying and distributing electric energy generated in the wind turbine 2.

In addition, the wind turbine 2 includes a strut 5, a nacelle 51 provided at an upper end of the strut 5, a hub 52 connected to a drive shaft (not illustrated) of a generator installed in the nacelle 51, and a plurality of wind turbine blades 6 attached to the hub 52.

With the above-mentioned configuration, the wind turbine 2 generates power by the plurality of wind turbine blades 6 receiving wind to rotate, thereby rotating the drive shaft of the generator via the hub 52.

Figure 2:
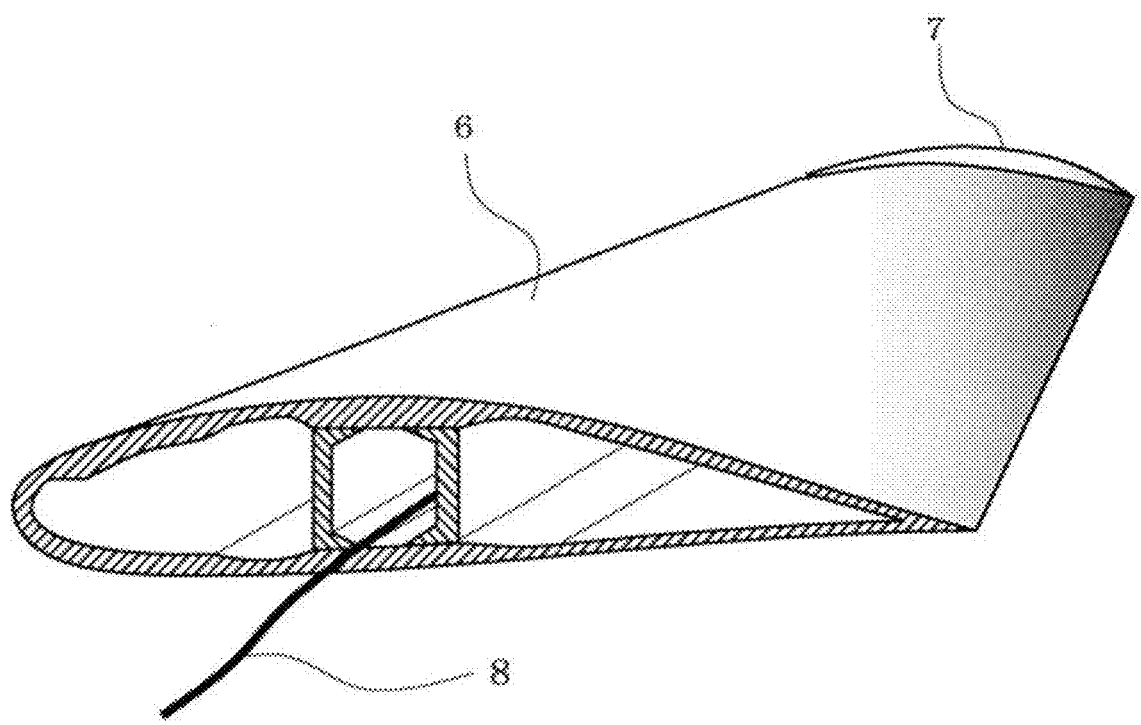
FIG. 2 is a cross-sectional view of a wind turbine blade to which the first embodiment of the present invention is applied.

As illustrated in FIG. 2, each wind turbine blade 6 has a lightning suppression device 7 provided at the tip thereof, and a ground line 8 installed therein.

Figure 3:
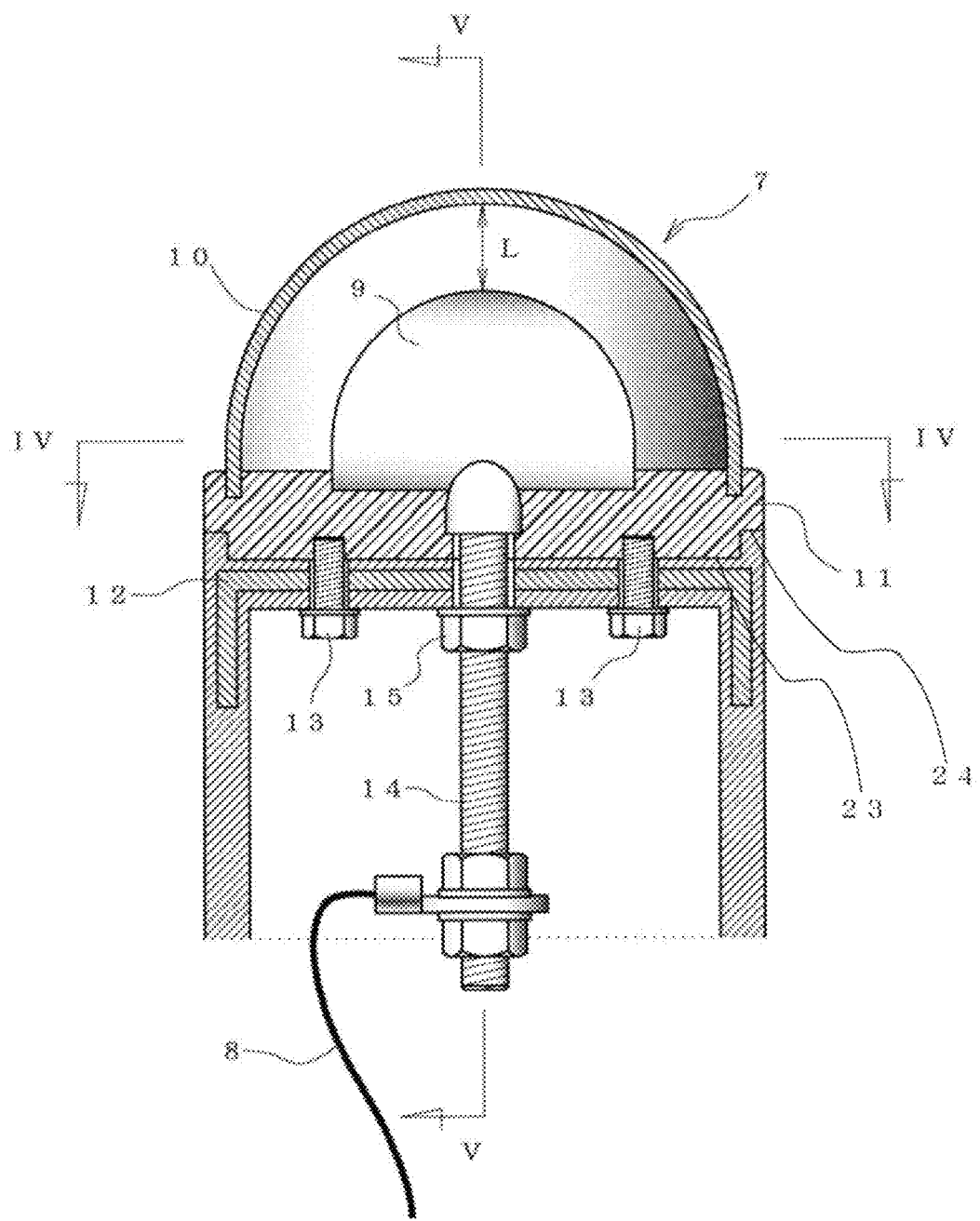
FIG. 3 is a cross-sectional view of a tip of the wind turbine blade to which the first embodiment of the present invention is applied.
Figure 4:
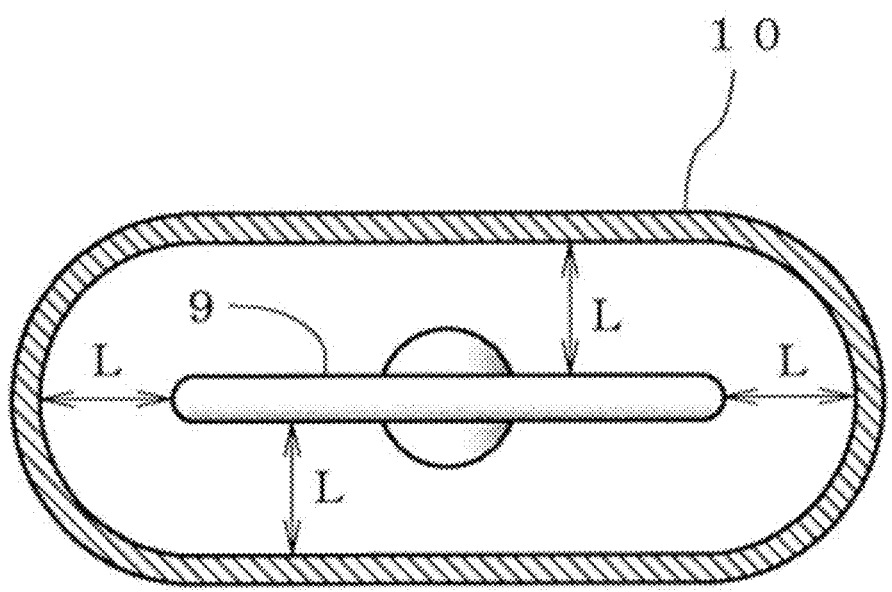
FIG. 4 is a cross-sectional view taken along line IV-IV of FIG. 3.
Figure 5:
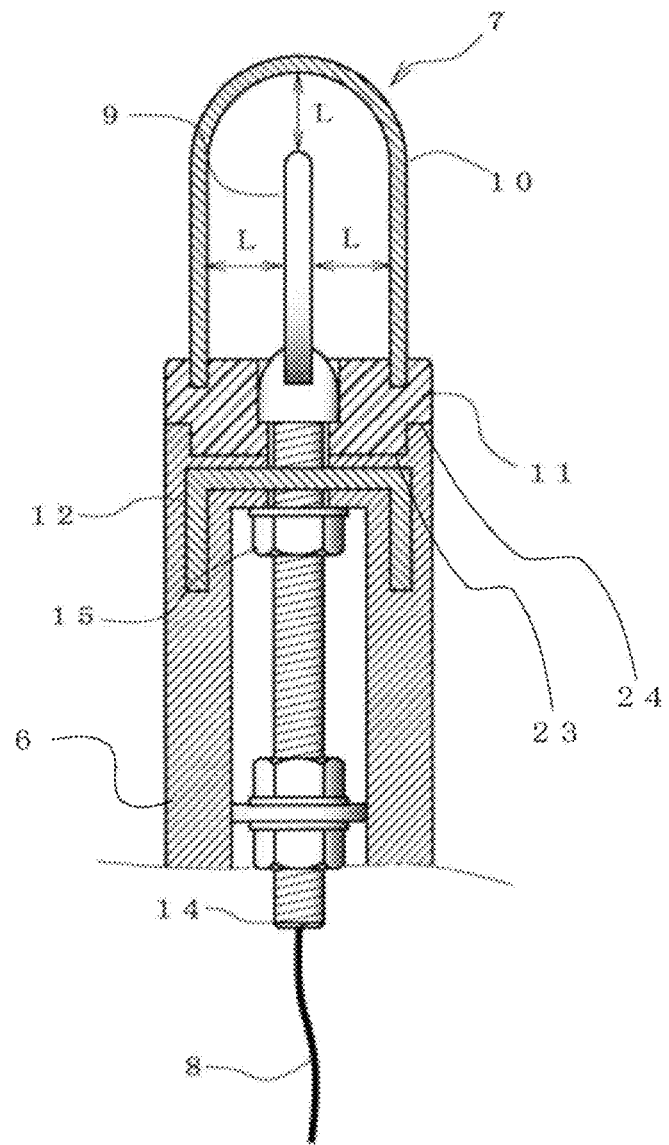
FIG. 5 is a cross-sectional view taken along line V-V of FIG. 3.

As illustrated in FIGS. 3 to 5, the lightning suppression device 7 includes: an internal electrode 9 (cross section thereof is not illustrated) formed into a semicircular plate shape; an external electrode 10 formed into a substantially flat shape having a substantially hemispherical shell-shaped cross section and disposed so as to surround the internal electrode 9 with a predetermined gap L therebetween; and an electrical insulator 11 fixed to the tip of the wind turbine blade 6 and having the internal electrode 9 and the external electrode 10 attached thereto on a side opposite to the wind turbine blade 6.

Here, the tip of the wind turbine blade 6 is closed. It is preferable that a reinforcing plate 12 is embedded, in the wind turbine blade 6, from the tip to a peripheral wall.

Besides, here, the substantially hemispherical shell-shaped cross section of the external electrode 10 is preferably formed to extend substantially along an extended surface of an outer surface of the wind turbine blade 6.

Respective lower ends of the internal electrode 9 and the external electrode 10 are fitted to the electrical insulator 11 at a predetermined depth, and are adhesively fixed thereto via an adhesive or the like.

The internal electrode 9 and the external electrode 10 are made of a conductive material such as stainless steel.

The electrical insulator 11 is made of a non-conductive material such as fiber reinforced plastic (FRP).

The electrical insulator 11 is disposed while being in surface contact with a tip surface of the wind turbine blade 6, and is firmly crimped and fixed by fixing members 13 (cross section thereof is not illustrated).

The lightning suppression device 7 is attached to the tip of the wind turbine blade 6 via contact surfaces 23 and 24.

The contact surface 23 is a flat surface. The contact surface 24 is a surface formed with a concave-convex structure, and the contact surface 24 mates the lightning suppression device 7 with the tip of the wind turbine blade 6.

Here, in the present embodiment, bolts are used as the fixing members 13, which penetrate the tip surface of the wind turbine blade 6 and the reinforcing plate 12 from the inside of the wind turbine blade 6 and are screwed to the electrical insulator 11. As a result, the electrical insulator 11 is firmly crimped and fixed to the tip of the wind turbine blade 6.

In addition, through holes are continuously formed in central portions of the tip surface of the wind turbine blade 6, the electrical insulator 11, and the reinforcing plate 12, and then, the connecting rod 14 (cross section thereof is not illustrated) is inserted into these through holes from the inside of the wind turbine blade 6.

In that case, a connection portion into which the connecting rod 14 can be screwed is fitted to a lower end portion of the internal electrode 9 and is fixed thereto through welding or the like.

The connecting rod 14 is made of a conductive material such as stainless steel.

The tip of the connecting rod 14 is screwed into the connection portion provided at the lower end portion of the internal electrode 9.

As a result, the connecting rod 14 supports the internal electrode 9.

Besides, the connecting rod 14 receives a fixing nut 15 (cross section thereof is not illustrated) being screwed to an intermediate portion thereof.

The fixing nut 15 is brought into pressure contact with an inner surface of the tip of the wind turbine blade 6, and cooperates with the internal electrode 9 to sandwich and fix the tip of the wind turbine blade 6, the electrical insulator 11, and the reinforcing plate 12.

One end of the ground line 8 is electrically connected to the connecting rod 14 inside the wind turbine blade 6.

Here, in the present embodiment, the ground line 8 is connected to a crimp terminal and is sandwiched while being crimped by two fixing nuts separate from the fixing nut 15 which are screwed to the connecting rod 14.

In addition, the ground line 8 extends through the inside of the strut 5 and the other end thereof is buried in ground A.

Figure 12:
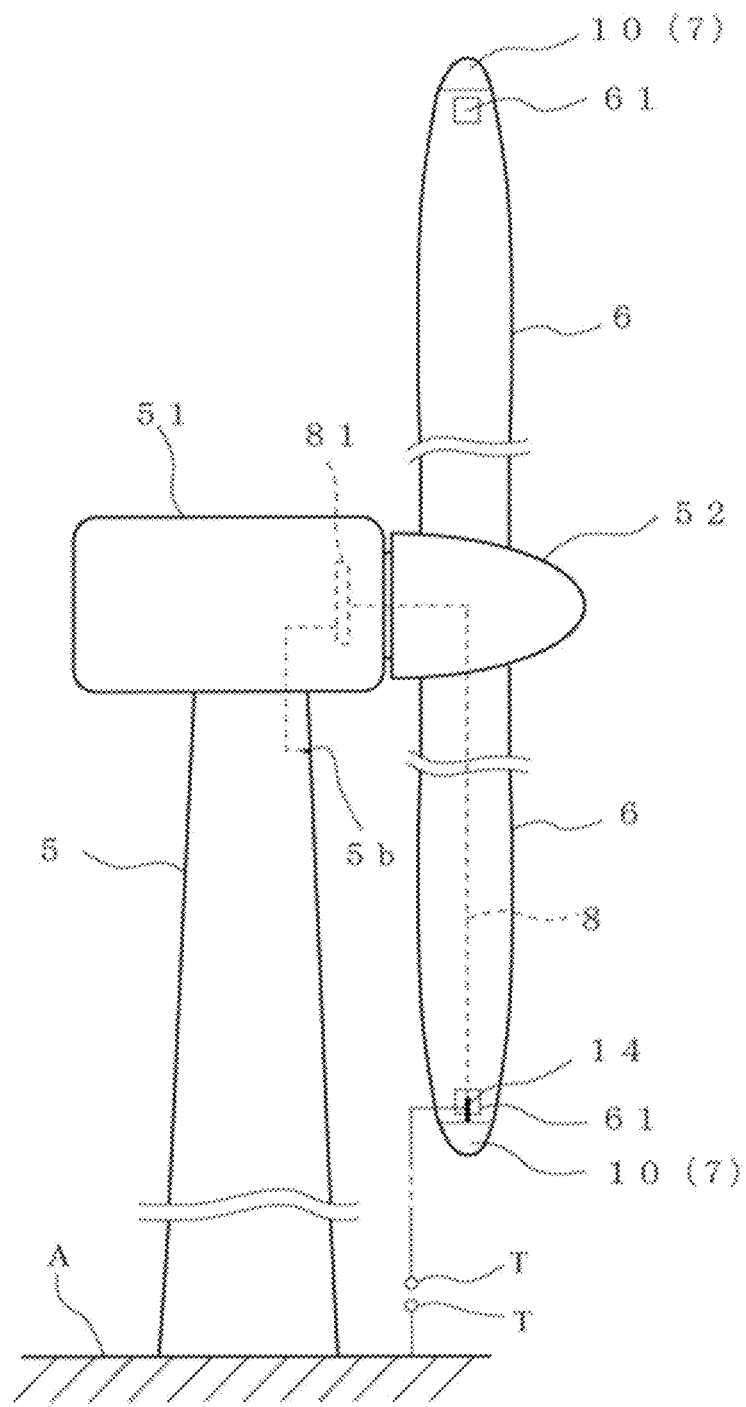
FIG. 12 is a schematic side view for explaining a route of a ground line extending from a connecting rod in a lightning suppression device of the present invention.

As an example illustrated in FIG. 12, when an inner surface 5b of the strut 5 is made of a conductive metal, the ground line 8 may be electrically connected to the inner surface 5b instead of being buried in the ground A.

Furthermore, as for the ground line 8, as illustrated in FIG. 12, a slip brush 81 is provided inside the nacelle 51, and thus, the electrical connection through the ground line 8 is maintained even when the wind turbine blades 6 are rotating.

In the lightning suppression device 7 of the present embodiment which is thus configured, the user firstly places the electrical insulator 11 having the internal electrode 9 and the external electrode 10 attached thereto, so as to be in surface contact with the tip of the wind turbine blade 6.

Next, the user uses the fixing members 13 to crimp and fix the electrical insulator 11 to the tip of the wind turbine blade 6.

Next, the user causes the connecting rod 14 to screw into the connection portion provided in a lower end portion of the internal electrode 9.

Then, the user brings the fixing nut 15 into pressure contact with the inner surface of the tip of the wind turbine blade 6 to cause the fixing nut 15 and the internal electrode 9 to cooperate with each other, thereby sandwiching and fixing the tip of the wind turbine blade 6 and the electrical insulator 11.

In accordance with the flow mentioned above, the user can assemble the lightning suppression device 7 and fix the device to the tip of the wind turbine blade 6.

Here, the user of the lightning suppression device 7 can fix the electrical insulator 11 to the tip of the wind turbine blade 6 while avoiding the internal electrode 9 and the external electrode 10.

That is, since the internal electrode 9 and the external electrode 10 are attached to the electrical insulator 11 on the side opposite to the wind turbine blade 6, there is a wide area in the electrical insulator 11 for a portion where bolts serving as the fixing members 13 to the tip of the wind turbine blade 6 is to be provided.

Therefore, the user of the lightning suppression device 7 can relatively freely select the installation position and the number of bolts serving as the fixing members 13 to firmly fix the electrical insulator 11 and the tip of the wind turbine blade 6.

As a result, the lightning suppression device 7 can prevent the detachment thereof from the tip of the wind turbine blade 6 while sufficiently resisting the centrifugal force and the wind pressure resistance force so as to secure the soundness of the wind turbine 2.

In addition, when a thundercloud is approaching and the bottom of the thundercloud is negatively charged, the surface of the ground A located below the thundercloud is positively charged due to electrostatic induction.

In that case, since the internal electrode 9 is electrically connected to the surface of the ground A and thus is positively charged, the external electrode 10 is negatively charged due to electrostatic induction.

Since the external electrode 10 has a negative charge which is the same type as the charge at the bottom of the thundercloud, when the wind turbine blades 6 rotate and the tip of one wind turbine blade 6 faces the thundercloud, the potential difference between the bottom of the thundercloud having a negative charge and the external electrode 10 also having a negative charge is reduced.

Therefore, the generation of streamer from the external electrode 10 is suppressed, and thus, it becomes possible to suppress a direct hit of lightning as feedback current to the external electrode 10.

Such a lightning suppression effect is expected to extend to the entire wind turbine 2 and the power supply and distribution facility 3 and the power transmission line 4 provided side by side with the wind turbine 2, by the negative charge distribution region in the external electrode 10 serving as a role of a barrier for protecting an area therebelow from the direct hit of lightning.

Figure 6:
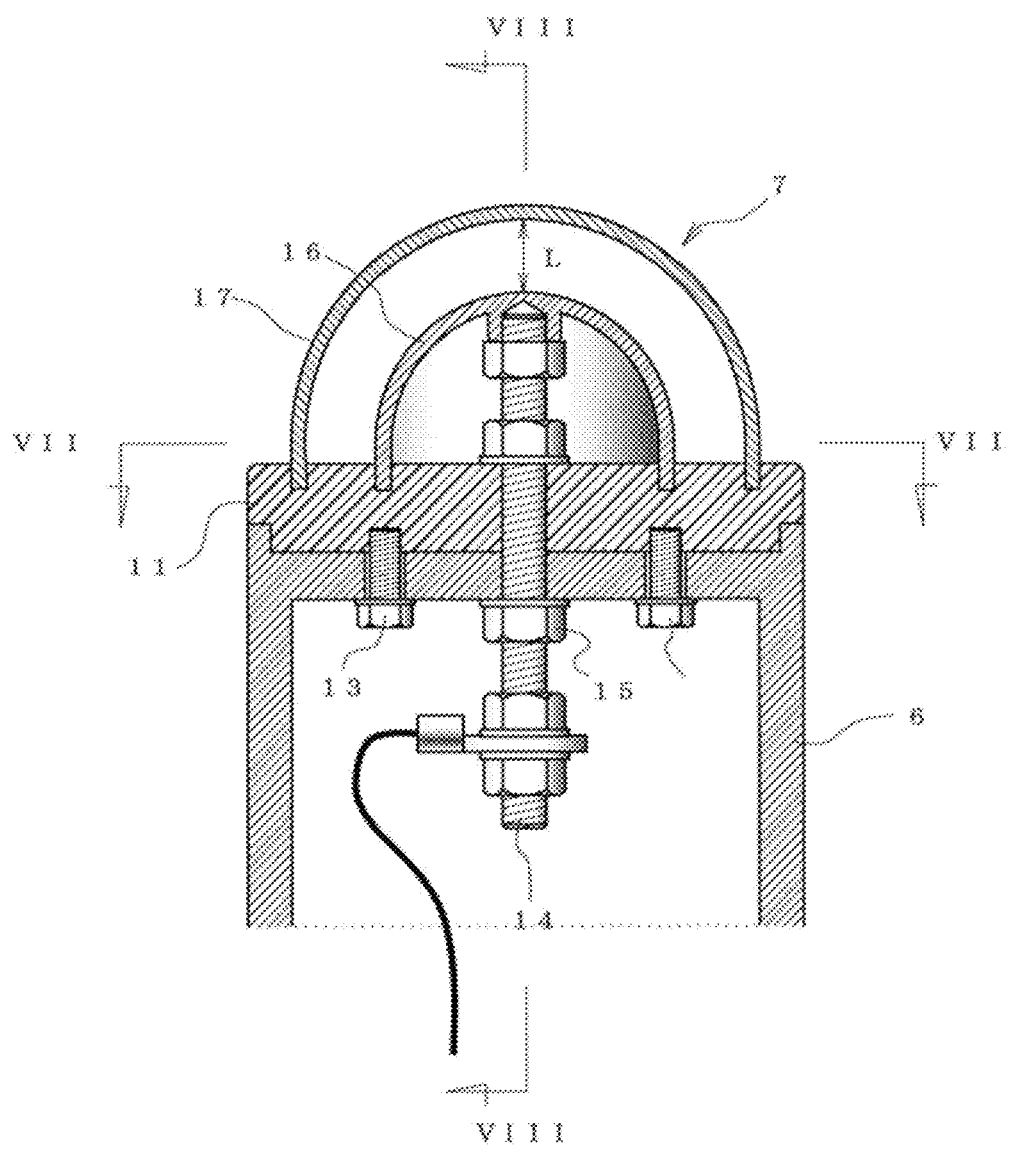
FIG. 6 is a cross-sectional view of a tip of a wind turbine blade to which a second embodiment of the present invention is applied.
Figure 7:
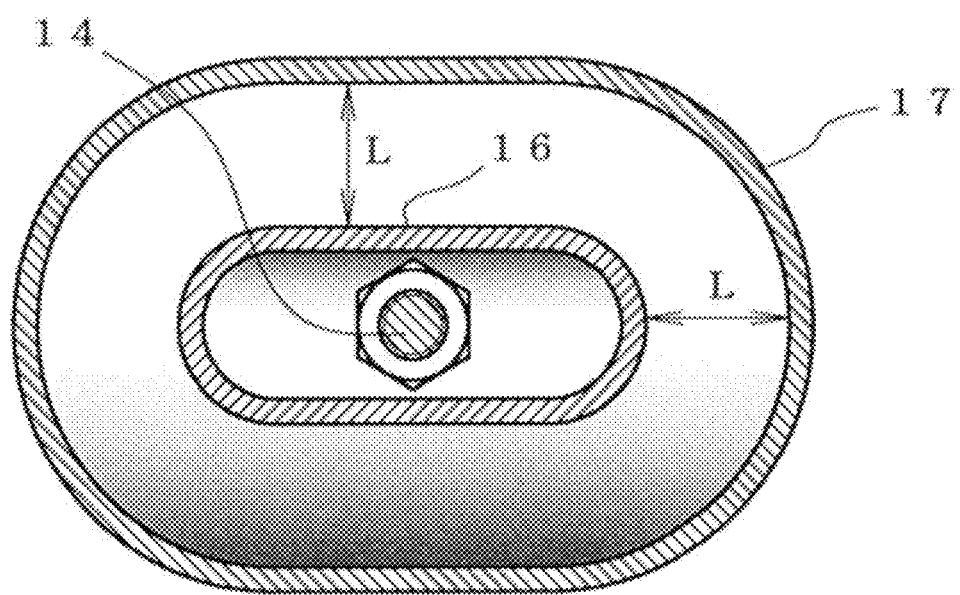
FIG. 7 is a cross-sectional view taken along line VII-VII of FIG. 6.
Figure 8:
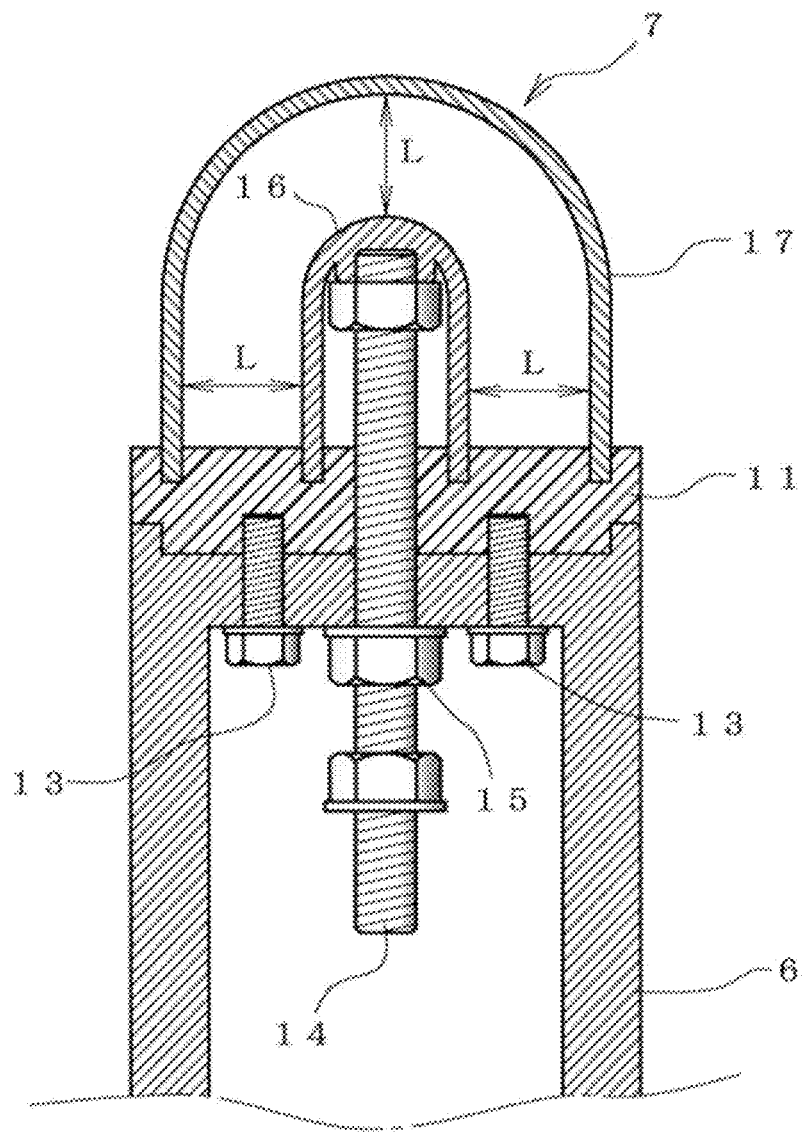
FIG. 8 is a cross-sectional view taken along line VIII-VIII of FIG. 6.

As a second embodiment of the present invention, as shown in FIGS. 6 to 8, an internal electrode 16 is formed into a hollow shape unlike the internal electrode 9, and accordingly, the shape of an external electrode 17 is modified from that of the external electrode 10 so as to keep the distance from the internal electrode 16 constant.

Note that, since a fixing structure and the like for the electrical insulator 11 are substantially identical to those in the first embodiment, the same reference signs are given to simplify the description thereof.

An outer shape of the internal electrode 16 is formed into a substantially flat shape that is a substantially hemispherical shell shape in cross section as well as a hollow shape, and includes, at the inner center thereof, a connection portion into which the tip of the connecting rod 14 is screwed.

In addition, the fixing nuts 15 screwed to the connecting rod 14 include one brought into pressure contact with the inner surface of the tip of the wind turbine blade 6 pressure contact with the inner surface of the tip end surface of the wind turbine blade 6 and one brought into pressure contact with the electrical insulator 11 inside the internal electrode 16, which sandwich and fix the tip of the wind turbine blade 6 and the electrical insulator 11 in cooperation with each other.

In the second embodiment of the present invention, the user can increase the pole plate area of a capacitor formed by the internal electrode 16 and the external electrode 17 so as to increase the electrostatic capacitance thereof.

As a result, the lightning suppression device 7 according to the second embodiment of the present invention can further enhance the lightning suppression effect by guiding more charges to the external electrode 17 and enlarging a charge distribution region in the external electrode 17.

Figure 9:
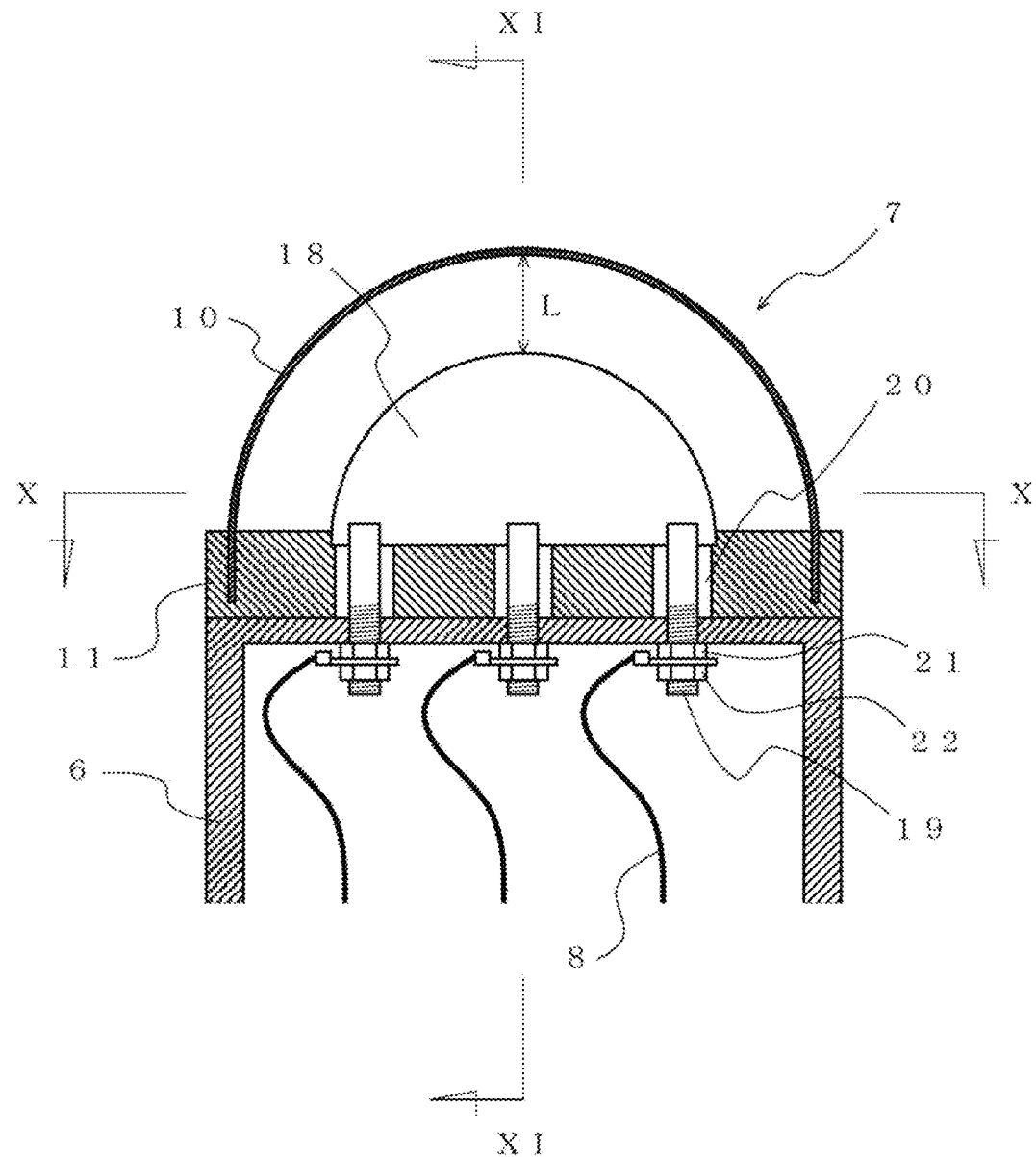
FIG. 9 is a cross-sectional view of a tip of a wind turbine blade to which a third embodiment of the present invention is applied.
Figure 10:
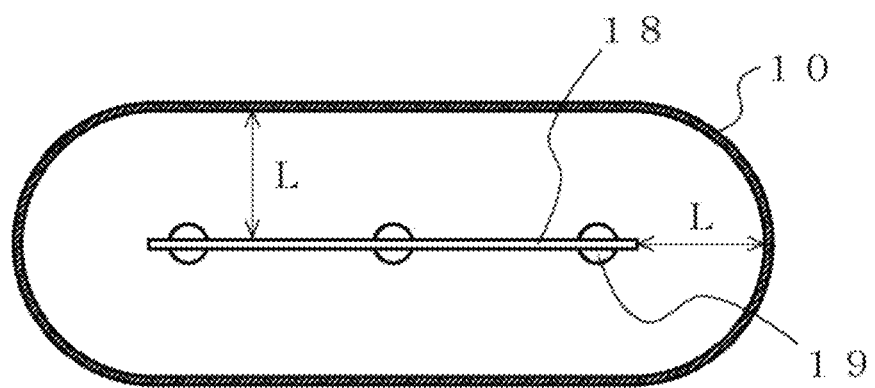
FIG. 10 is a cross-sectional view taken along line X-X of FIG. 9.
Figure 11:
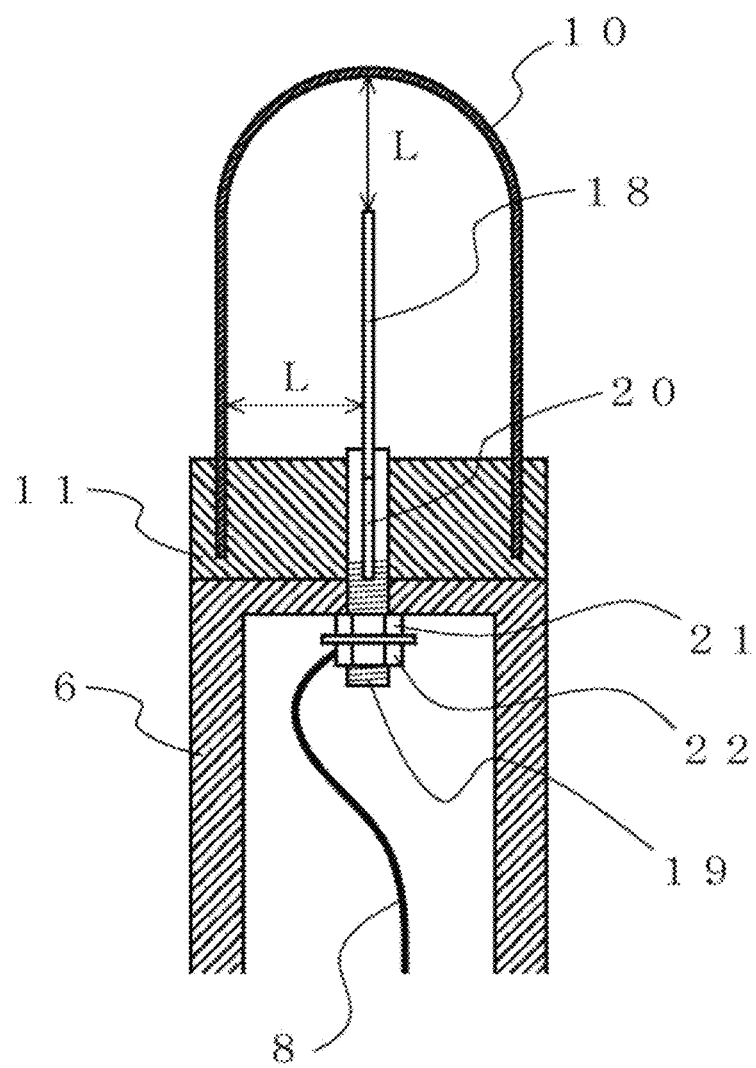
FIG. 11 is a cross-sectional view taken along line XI-XI in FIG. 9.

As a third embodiment of the present invention, as illustrated in FIGS. 9 to 11, the fixing structure for an internal electrode 18 is modified from that of the internal electrode 9.

Note that, since a fixing structure and the like for the external electrode 10 and the electrical insulator 11 are substantially identical to those in the first embodiment, the same reference signs are given to simplify the description thereof.

A plurality of connecting rods 19 (cross section thereof is not illustrated) are fitted to a lower end portion of the internal electrode 18 and fixed together with a support plate 20 (cross section thereof is not illustrated) through welding or the like.

Accordingly, a plurality of through holes are continuously formed in the tip surface of the wind turbine blade 6 and the electrical insulator 11, and the connecting rods 19 are inserted thereto from the inside of the wind turbine blade 6.

In that case, the support plate 20 is embedded in the electrical insulator 11.

Besides, each connecting rod 19 receives a fixing nut 21 (cross section thereof is not illustrated) and a fixing nut 22 (cross section thereof is not illustrated) being screwed thereto.

The fixing nut 21 is brought into pressure contact with the inner surface of the tip surface of the wind turbine blade 6, and cooperates with the internal electrode 18 to sandwich and fix the tip of the wind turbine blade 6 and the electrical insulator 11.

Furthermore, the fixing nut 21 sandwiches and crimps the ground line 8 in cooperation with the fixing nut 22.

In the third embodiment of the present invention, the internal electrode 18 is supported by the plurality of connecting rods 19 and the support plate 20 and thus, is further stably fixed to the electrical insulator 11, whereby the soundness of the lightning suppression device 7 itself can be secured.

Note that the user of the wind power generation facility 1 is obliged to check whether the ground line 8 is not cut off once a year. Thus, it is necessary to access the connecting rod 14 (hereinafter, connecting rod 19 in the third embodiment) in order to confirm the conduction between the connecting rod 14 and the ground A.

In this case, as an example illustrated in FIG. 12, each wind turbine blade 6 preferably has an opening 61 with a lid in the vicinity of the tip thereof.

Here, the lid (not illustrated) of the opening 61 is configured such that a wind pressure resistance force due to the rotation of the wind turbine blades 6 acts in a direction in which the opening 61 closes.

With the above-mentioned configuration, the user of the wind power generation facility 1 can access the connecting rod 14 inside the wind turbine blade 6 from the outside thereof through the opening 61, and connect a probe for a conduction test to the connecting rod 14.

In each of the embodiments, the user may add a substantially streamlined structure made of a non-conductive material to the lightning suppression device 7 so as to provide a winglet structure to the wind turbine, thereby enhancing the aerodynamic characteristics of the wind turbine blades.

Note that various shapes and the like of the respective components described in each of the embodiments are merely examples, and can be variously modified on the basis of design requirements and the like.

Reference Signs List
1 wind power generation facility
2 wind turbine
3 power supply and distribution facility
4 power transmission line
5 strut
51 nacelle
52 hub
6 wind turbine blade
61 opening
7 lightning suppression device
8 ground line
81 slip brush
9 internal electrode
10 external electrode
11 electrical insulator
12 reinforcing plate
13 fixing member
14 connecting rod
15 fixing nut
16 internal electrode
17 external electrode
18 internal electrode
19 connecting rod
20 support plate
21 fixing nut
22 fixing nut
23 contact surface
24 contact surface
A ground
L gap

What is claimed is:

1. A lightning suppression device for wind turbine blades that is provided at a tip of a wind turbine blade and suppresses lightning struck on the wind turbine blade, the device comprising:
an electrical insulator attached to the tip of the wind turbine blade and formed of a non-conductive material;
an internal electrode attached to the electrical insulator on a side opposite to the wind turbine blade; and an external electrode attached to the electrical insulator so as to surround the internal electrode with a predetermined gap between the internal electrode and the external electrode, wherein
the electrical insulator is fixed to the tip of the wind turbine blade by a fixing member,
a ground line is connected to the internal electrode,
the internal electrode and the external electrode form a capacitor, and
the internal electrode is formed into a plate shape.

2. The lightning suppression device for wind turbine blades according to claim 1 wherein the internal electrode is formed into a semicircular shape.

3. The lightning suppression device for wind turbine blades according to claim 1, wherein the electrical insulator is formed so that an entire contact surface with the tip of the wind turbine blade is flat when attached to the tip of the wind turbine blade.

4. The lightning suppression device for wind turbine blades according to claim 3, wherein the electrical insulator has a concave structure which is fitted to a convex structure of the tip of the wind turbine blade.

5. The lightning suppression device for wind turbine blades according to claim 1, wherein a reinforcing member is provided at the tip of the wind turbine blade in an integrated manner, and the reinforcing member and the electrical insulator are fixed together to the tip of the wind turbine blade by the fixing member.

6. The lightning suppression device for wind turbine blades according to claim 1, wherein the external electrode has an outer surface formed to extend along an extended surface of an outer surface of the wind turbine blade.

7. The lightning suppression device for wind turbine blades according to claim 1, wherein the ground line is connected to the internal electrode via the fixing member.

8. The lightning suppression device for wind turbine blades according to claim 7, wherein a plurality of the fixing members is provided.

* * * * *